UNITED STATES PATENT OFFICE.

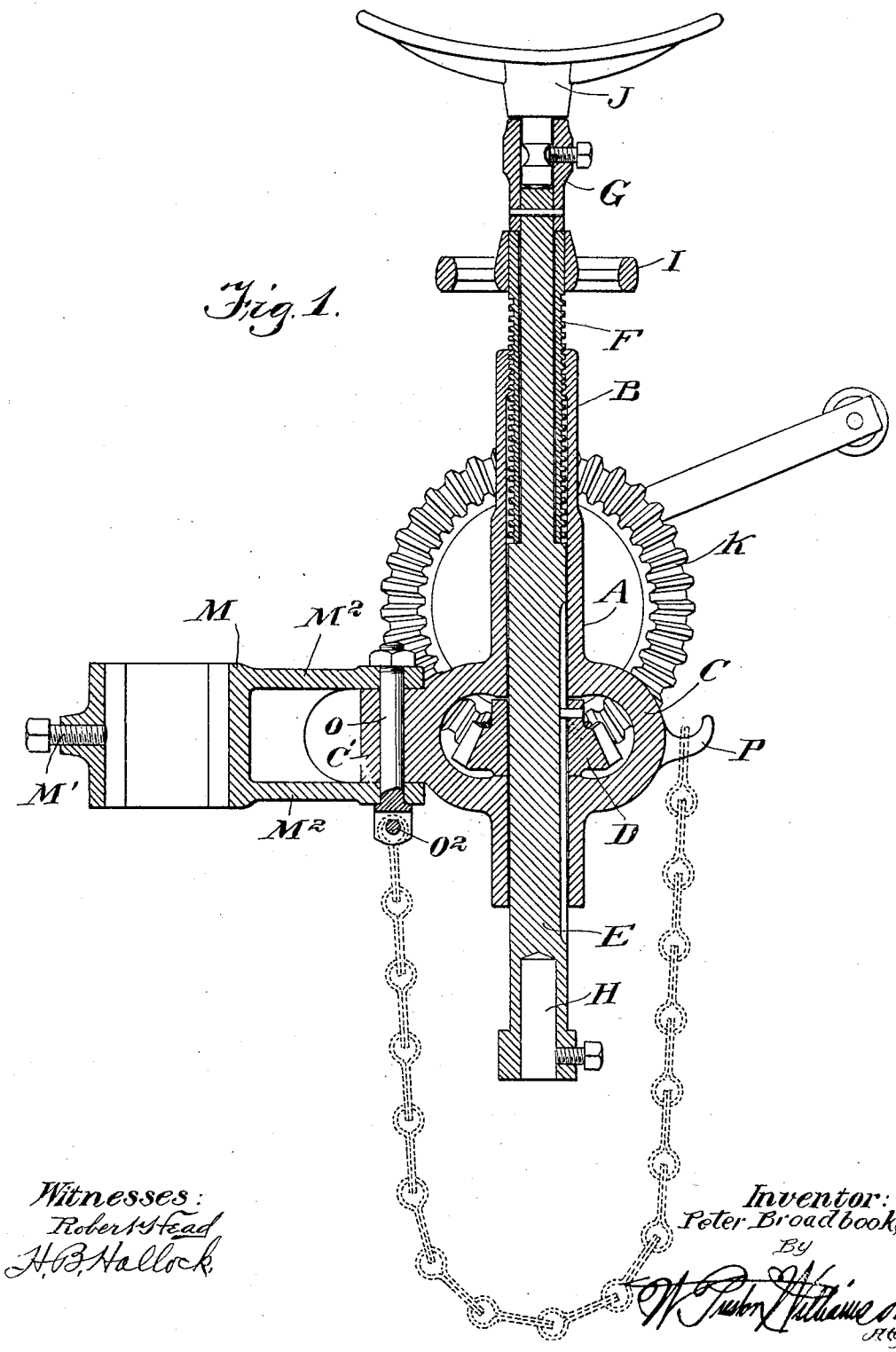

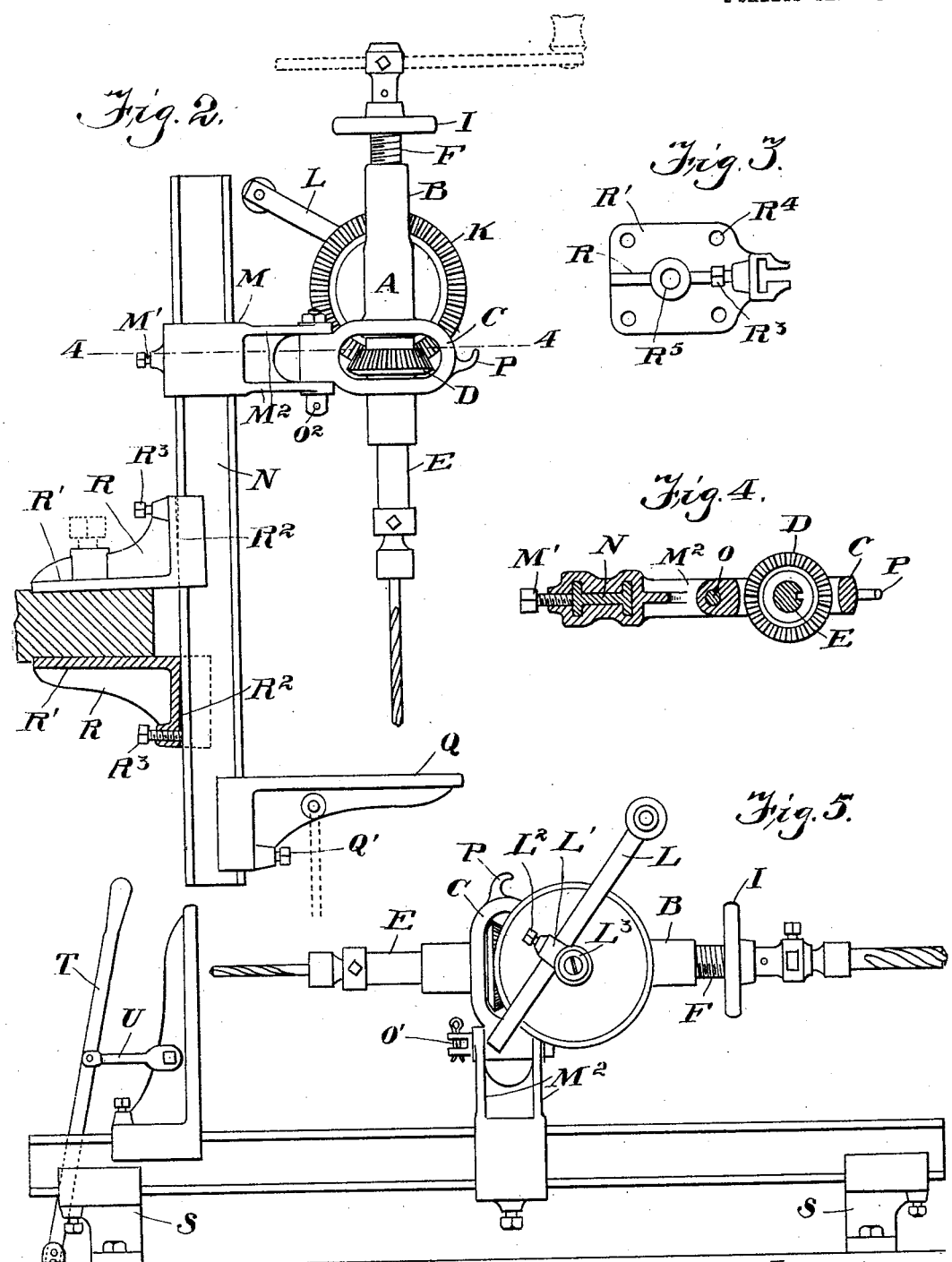

PETER BROADBOOKS, OF BATAVIA, NEW YORK.

COMBINATION DRILL AND DRILL-FRAME.

No. 805,838.  Specification of Letters Patent.  Patented Nov. 28, 1905.

Application filed June 21, 1904. Serial No. 213,509.

*To all whom it may concern:*

Be it known that I, PETER BROADBOOKS, a citizen of the United States, residing at Batavia, county of Genesee, and State of New York, have invented a certain new and useful Improvement in Combination Drills and Drill-Frames, of which the following is a specification.

My invention relates to a new and useful improvement in combination drills and drill-frames, and has for its object to so design and construct a device of this description that it may be used either as a bench-drill, brace-drill, or clamp-drill, and the device is also constructed so as to increase the adaptability of a drill of this character, reduce the cost of manufacture, and allow for the drill being put to more uses than an ordinary drill.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a vertical section through my improved drill in position to be used as a brace-drill; Fig. 2, a side elevation of my device fitted as a bench-drill; Fig. 3, a plan view of one of the clamping-plates for attaching the standard of a drill to a bench; Fig. 4, a section taken on the line 4 4 of Fig. 2; Fig. 5, a side elevation of my device fitted as a horizontal drill.

A represents the drill-frame, which consists of the interiorly-threaded sleeve B and the yoke C, which surrounds the small beveled wheel D.

E is the spindle, which extends upward entirely through the frame A, and the small beveled wheel D is splined upon the spindle, so as to cause the spindle to revolve with the same, to allow said spindle to slide through the wheel. The upper end of the spindle E is reduced in diameter, and upon this reduced portion is fitted loosely the screw F, which screw is threaded in the sleeve B of the frame. Upon the upper end of the spindle E is secured a chuck G, and the lower end of the spindle is formed into a chuck H. The screw F is interposed between the chuck G and the shoulder formed by the reducing of the spindle E.

I is a hand-wheel secured to the screw F for the turning of the same for feeding the drill.

It will thus be seen that the spindle E is provided upon each end with a chuck, so that the drill may be secured into either end of said spindle, and in the upper chuck G may be swiveled a breast-plate J when the device is to be used as a breast-drill, or the chuck G may be used for holding an emery-wheel or any other device to be revolved.

K is a large beveled wheel journaled upon the drill-frame A and meshing with a small beveled gear D.

L is a crank-lever to be attached to the beveled wheel K for the turning of the same. This crank-lever L extends through an eye L', formed upon the side of the hub of the wheel K, and is secured in position by a set-screw L², threaded through the eye L' and bearing against the lever L. This eye L' may be formed integral with the hub of the wheel K, or it may be formed integral with the sleeve adapted to slip over the hub of the wheel K, and the hub being flattened and this flattened portion coming in contact with the lever L will cause the hub of the wheel K to turn with the lever L, one set-screw serving to hold the lever in position and also hold the the lever in tight contact with the flattened surface.

Upon one side of the yoke C is formed a boss C', which is bored parallel with the spindle of the drill. M is the sliding support of the drill, which has an opening formed therethrough adapted to fit the standard N and slide thereon and be secured in position by the set-screw M'. This sliding support M is provided with two prongs M², extending outward therefrom and straddling the boss C'. A bolt O is passed through both prongs and through the boss C', thus forming a hinge. When the drill is detached from the standard and used as a breast-drill, the holder M will serve as a handle for holding the drill steady while drilling, and by providing a handle between the drill-frame and the support M the drill may be swung to either side when being used as a bench-drill. The head of the bolt O is upon the lower side, and said head is split, as represented at O' in Fig. 5, and between the two prongs of the head may be inserted one link of a chain, (shown in dotted lines in Fig. 1,) and said chain may be secured to the bolt by passing a cotter-pin or small bolt O² through the prongs and through the link. Upon the opposite side of the yoke C is formed a hook-shape stud P, to which the other end of the chain may be attached when the drill is being used as a chain-drill for boring round articles.

Q represents the work-support which is to be used in connection with the standard N. The standard N is made in the form of a double channel-iron, and the work-support Q is so formed at its rearward end as to slide upon the standard N, but does not engage both flanges of the standard and only embraces one flange and half of the web, said work-support being held in position by the set-screw Q'.

R represents clamping-plates to be used for securing the standard N to a bench or like object. Each of these clamping-plates consists of a horizontal surface R', coming in contact with the bench, and a vertical portion R², slotted to slide upon the standard N and engage one of the flanges of said standard, but does not extend beyond the middle of the standard, so that the work-support Q may pass the clamping-plates and be set at any position desired along the standard N. Set-screws R³ of the clamping-plates are threaded through the vertical portion of said plates at the end farthest from the horizontal portion, so that when the set-screws are set tightly against the edge of the standard N it will cause the horizontal plates R' to be tilted, as shown in Fig. 2, and therefore press tightly against both sides of the bench. This will ordinarily be sufficient for the holding of the drill-frame; but, if desired, ordinary screws may be passed through the holes R⁴ of the clamping-plates, or a set-screw may be threaded through the threaded opening R⁵, provided for the same in the top clamping-plate, as shown in dotted lines in Fig. 2.

In Fig. 5 I have shown a drill in position as a horizontal drill, and when used in this position the standard-supports S engage the standard the same way as the clamping-plates R; but these supports are so constructed as to be bolted upon the surface of a bench, or the drill may be made into a vertical drill by bolting these supports S against the wall or any other vertical surface. In this view I have shown a drill secured in each end of the standard. This is a great advantage where it is desired to either use two size drills or one metal drill and one wooden auger, as it would not then be necessary to remove the drills each time the different holes were to be bored.

If it is not desirable to feed the drill by the hand-wheel, the work-support Q need not to be set upon the standard N and may be allowed to slide freely thereon and may be connected to a lever T through a link U, and the work-support may be fed by hand or foot. In this manner the work-support could be used as a feed, also when the device is used as a vertical bench-drill, the link being shown connected in dotted lines in Fig. 2.

There are many advantages in the construction of a drill, among them being the following: The handle which holds the drill-frame in position while the same is being used as a breast-drill also forms a holder to the drill-frame when the device is used as a bench or post drill. The holder being hinged to the drill-frame not only allows the handle to be adjusted in either direction when used as a breast-drill, but also allows a radius of movement without changing the position of the standard when the drill is used as a bench-drill. By attaching a chain to the connecting-bolt upon one side and to the hook-shaped stud upon the other side the drill may be used as an ordinary chain brace-drill without increasing its expense. By forming a chuck or socket upon the upper end of the spindle the same may be used for holding either the breast-plate or the crank-lever in position with the same set-screw, and this construction will also provide for holding bits and the mandrel or arbor of an emery-wheel, which will make the tool very useful for grinding knives, drill-bits, &c., without increasing the expense and construction of the hand-drill.

By constructing the standard-supports and work-support in such a manner that the same may pass one another upon the standard without interfering a great advantage is gained, as the drill is made more convenient to operate and less expensive to manufacture.

Of course I do not wish to be limited to the exact construction here shown, as slight modifications could be made without departing from the spirit of my invention.

Having thus fully described my invention, what I claim as new and useful is—

In a drill of the character described, a drill-frame, a drill-support connected to the drill-frame and extending outward at right angles thereto, a standard channeled longitudinally so as to provide a flange at its rearward and forward side, the support provided with an eye, said eye being of the same contour as the cross-section of the standard, the standard adapted to pass over the eye so that the support may fit and slide upon said standard, means for securing the support in any position placed, standard-supports for securing the standard to a bench, wall or horizontal surface, said standard-supports constructed to embrace one flange of the standard and so proportioned as to extend less than one-half way across the standard, means for securing said supports in any position placed along the standard, a work-support also adjustable along the standard, said support embracing the opposite flange of the standard and extending less than one-half of the distance across the standard toward the opposite flange so that the work-support may pass the standard-supports when being adjusted along the standard, as and for the purpose specified.

In testimony whereof I have hereunto affixed my signature in the presence of two subscribing witnesses.

PETER BROADBOOKS.

Witnesses:
GEORGE A. KAPELL,
C. H. BERGMAN.